US009125131B2

(12) United States Patent
Norp et al.

(10) Patent No.: US 9,125,131 B2
(45) Date of Patent: Sep. 1, 2015

(54) METHOD AND TELECOMMUNICATIONS INFRASTRUCTURE ENABLING LOCALIZED TIME CONTROLLED ACCESS FOR A DEVICE

(75) Inventors: Antonius Norp, The Hague (NL); Michael Schenk, The Hague (NL); Johannes Maria van Loon, Zoetermeer (NL)

(73) Assignees: Koninklijke KPN N.V., The Hague (NL); Nederlandse Organisatie Voor Toegepast-Natuurwetenschappelijk Onderzoek Tno, Delft (NL)

( * ) Notice: Subject to any disclaimer, the term of this patent is extended or adjusted under 35 U.S.C. 154(b) by 293 days.

(21) Appl. No.: 13/577,531

(22) PCT Filed: Feb. 7, 2011

(86) PCT No.: PCT/EP2011/051713
§ 371 (c)(1),
(2), (4) Date: Sep. 12, 2012

(87) PCT Pub. No.: WO2011/095618
PCT Pub. Date: Aug. 11, 2011

(65) Prior Publication Data
US 2012/0329455 A1 Dec. 27, 2012

(30) Foreign Application Priority Data

Feb. 8, 2010 (EP) .................................. 10152891
Jun. 14, 2010 (EP) .................................. 10165825

(51) Int. Cl.
*H04W 4/00* (2009.01)
*H04W 48/02* (2009.01)

(52) U.S. Cl.
CPC ............. *H04W 48/02* (2013.01); *H04W 4/005* (2013.01); *H04W 4/00* (2013.01)

(58) Field of Classification Search
CPC ............ H04W 8/12; H04W 8/04; H04W 8/06
USPC ........................................... 455/433
See application file for complete search history.

(56) References Cited

U.S. PATENT DOCUMENTS 6,230,017 B1    5/2001 Andersson et al.
6,275,695 B1    8/2001 Obhan
(Continued)

FOREIGN PATENT DOCUMENTS

EP    2096884 A1    9/2009
EP    2096885 A1    9/2009

OTHER PUBLICATIONS

European Search Report, European Patent Application No. 10165825.0 dated Mar. 28, 2011.
(Continued)

*Primary Examiner* — William D Cumming
(74) *Attorney, Agent, or Firm* — McDonnell Boehnen Hulbert & Berghoff LLP

(57) ABSTRACT

An infrastructure and method for controlling wireless access to a telecommunications infrastructure for a device includes a first access grant time interval applicable for granting access for the device to the telecommunications infrastructure stored in a device register system. The first access grant time interval is applied when the device requests access to the telecommunications infrastructure via a first network node of the telecommunications infrastructure. However, a second access grant time interval is applied in a second network node of the telecommunications infrastructure when the device requests access via the second network node. The second access grant time interval is applicable for granting access for the device to the telecommunications infrastructure and is different from the first access grant time interval.

18 Claims, 9 Drawing Sheets

(56) References Cited

U.S. PATENT DOCUMENTS

2004/0192306 A1 9/2004 Elkarat et al.
2012/0329455 A1* 12/2012 Norp et al. .................. 455/433

OTHER PUBLICATIONS

PCT International Search Report and Written Opinion, PCT International Application No. PCT/EP2011/051713 dated Mar. 28, 2011.
"3rd Generation Partnership Project; Technical Specification Group Services and System Aspects; Service Requirements for Machine-Type Communications; Stage 1 (Release 10)", 3GPP TS 22.368 V1.1.1, (Nov. 2009), pp. 1-23.
Alcatel-Lucent, "Time Controlled MTC Feature", 3GPP TSG SA WG2 Meeting #77, Jan. 18-22, 2010, Shenzhen, China, TD S2-100123, pp. 1-2.
"3rd Generation Partnership Project; Technical Specification Group Services and System Aspects; General Packet Radio Service (GPRS) Enhancements for Evolved Universal Terrestial Radio Access Network (E-UTRAN) Access (Release 9)", 3GPP TS 23.401 V9.3.0, (Dec. 2009), pp. 1-254.
Rigney, C. et al., "Remote Authentication Dial in User Service (RADIUS)", Network Working Group, Request for Comments 2138, Apr. 1997, pp. 1-61.
Rigney, C., "Radius Accounting", Network Working Group, Request for Comments 2139, Apr. 1997, pp. 1-25.
"Telecommunications and Internet Converged Services and Protocols for Advanced Networking (TISPAN); Network Attachment; Network Access xDSL and WLAN Access Networks; Interface Protocol Definitions", ETSI TS 183 019, V1.1.1, Dec. 2005, pp. 1-21.
"3rd Generation Partnership Project; Technical Specification Group Services and System Aspects; 3GPP System to Wireless Local Area Network (WLAN) Interworking; System Description (Release 9)", 3GPP TS 23.234 V9.0.0, Dec. 2009, pp. 1-84.

* cited by examiner

METHOD AND TELECOMMUNICATIONS INFRASTRUCTURE ENABLING LOCALIZED TIME CONTROLLED ACCESS FOR A DEVICE

CROSS REFERENCE TO RELATED APPLICATIONS

The present application is a national stage entry of PCT/EP2011/051713, filed Feb. 7, 2011, and claims priority to EP 10152891.7, filed Feb. 8, 2010, and EP 10165825.0, filed Jun. 14, 2010. The full disclosures of EP 10152891.7, EP 10165825.0, and PCT/EP2011/051713 are incorporated herein by reference.

FIELD OF THE INVENTION

The invention relates to the field of telecommunications. More specifically, the invention relates to the field of controlling access for a device to a telecommunications infrastructure.

BACKGROUND OF THE INVENTION

Telecommunications networks that provide wireless access (e.g. GSM, UMTS, WiMax, LTE, WLAN) have developed tremendously over the past years. In such networks, voice and data services can be provided to communication devices having a high mobility, i.e. the communication devices are not bound to a particular location and are freely movable through the area covered by the network or the networks of roaming partner operators. A gateway node of the telecommunications network enables connection to a further network, for example a network based on IP, such as the internet.

The availability of such a telecommunications network connected to the further network has resulted in demands for further services, including services that relate to so-called machine-to-machine (M2M) communications, also referred to as machine-type communications (MTC). M2M is currently being standardized in 3GPP (see e.g. TS 22.368). MTC applications typically involve hundreds, thousands or millions of communication devices which each act as a communication device to the telecommunication network. Such communication devices may be stationary or non-stationary. An example involves the electronic reading of e.g. 'smart' electricity meters at the homes of a large customer base over the telecommunications network from a server connected to the further network. Other examples include sensors, meters, vending or coffee machines, car meters for route pricing applications, navigation equipment, etc. that can be equipped with communication modules that allow exchanging information with other equipment such as a data processing centre over the telecommunications network. Such devices may also be monitored by the server. The data processing centre may e.g. store the data and/or provide a schedule for maintenance people to repair or refill a machine, meter or sensor or may update information in the device. Also, the data processing centre may be configured for processing data received from mobile communications devices, e.g. for road pricing applications.

Many M2M applications are not time critical. A device may need to send/receive data regularly to/from a server, for instance every 24 hours, but has no further requirements about a specific time. In such cases a network operator may decide to schedule network access for these devices in a non-busy time period, as was e.g. disclosed in EP 2 096 884, which is incorporated by reference in the present application in its entirety. This leads to a situation wherein groups of devices are assigned a specific group time interval in which they will be granted access and outside that group time interval, they will be denied access. Granting and denying access can pertain to network attaches as well as connection setups and allows the network operator to control the use of network resources.

However, the group time interval may not be a suitable period in all parts of a telecommunications network or for visited networks in case of moving devices, such as navigation systems or road pricing devices in vehicles. As an example, the non-busy period of the home operator is not necessarily a non-busy period for the visited operator, wherein the telecommunications network of the home operator and the telecommunications network of the visited operator form a telecommunications infrastructure. This could be because the visited and home operators are in different time zones, or because the visited operator has already scheduled devices for other M2M applications in the group time interval assigned by the home operator.

On the other hand, the devices may still need to send information to or retrieve information from the server, e.g. map updates for a navigation device.

Similar considerations may also apply outside the context of M2M applications.

SUMMARY OF THE INVENTION

A method is disclosed for controlling wireless access to a telecommunications infrastructure for a device. A first access grant time interval applicable for granting access for the device to the telecommunications infrastructure is stored in a device register system. The device register system may e.g. register information about the subscription of the device and/or information on the device itself. The first access grant time interval is applied when the device requests access to the telecommunications infrastructure via a first network node of the telecommunications infrastructure. However, a second access grant time interval is applied in a second network node of the telecommunications infrastructure when the device requests access via the second network node. The second access grant time interval is applicable for granting access for the device to the telecommunications infrastructure and is different from the first access grant time interval.

Furthermore, a telecommunications infrastructure comprising a device register system, a first network node and a second network node is disclosed. The device register system is configured for storing a first access grant time interval applicable for granting access for the device to the telecommunications infrastructure. The device register system may e.g. register information about the subscription of the device and/or information on the device itself. The first network node is configured for granting access during the first access grant time interval when the device requests access via the first network node. The second network node comprises or is configured to exchange information with an access controlling system configured for applying a second access grant time interval to control access to the telecommunications infrastructure when the device requests access via the second network node. The second access grant time interval is applicable for granting access for the device to the telecommunications infrastructure and is different from the first access grant time interval.

Moreover, a visiting network for the device comprising the second network node of the telecommunications infrastructure is disclosed.

Finally, an access controlling system provided in one or more network nodes of the telecommunications network is disclosed.

The disclosed method and system enable the (first) access grant time interval that is applicable for the device to (temporarily) be adapted to a different (second) access grant time interval for that same device in a different part of the telecommunications infrastructure. In other words, the method and system provide flexibility in the access grant time interval in different parts of the network. Accordingly, local circumstances in the different parts of the telecommunications infrastructure may be taken into account when deciding on the access of the device to the telecommunications infrastructure.

Examples of such local circumstances include a telecommunication network covering multiple time zones, wherein the time zone for the first network node differs from the time zone for the second network node. It also enables operators of visited networks employing a second network node to adapt the access grant time interval of the first network node of the home network of the device according to the needs or requirements of the visited network, as defined in claims 2 and 9. In other words the visited network operator has the ability to adapt the access grant time interval in which access is granted to a grant access time interval that is better suited to serve its own needs or requirements regarding e.g. network traffic load or contractual obligations to third parties.

The adaptation of the first access grant time interval may comprise shifting the entire time interval, or modifying at least one of the start time and the end time of the first access grant time interval or to split the time interval into multiple intervals.

The access grant time interval may be the time interval assigned to a single device or to a group of devices.

It should be appreciated that, except for special circumstances such as the application of a forbidden time interval described below, access to the telecommunications infrastructure via the second network node may be granted outside the first and/or second access grant time interval. Whereas, apart from the different access time intervals, access to the telecommunications network is obtainable under the same conditions, access outside the first and/or second access grant time interval may be granted under different conditions, such as higher prices, lower quality of service etc. The conditions may depend on one or more network parameters at the second network node, e.g. the traffic load. The conditions may be communicated to the device with either an accept message or a reject access message. If an accept message is used, the device is responsible for not establishing the connection if it does not want to accept the conditions. If a reject message is used, the device may repeat a request for the connection setup in the case that it wants to accept the conditions, the second network, being aware that this is a re-request can immediately grant access. The device may also beforehand communicate acceptable conditions to the second network node with the request for access to the telecommunications infrastructure. A device configured for performing this functionality is also disclosed in the present application.

It should be appreciated that the term "telecommunications infrastructure" may either include a single telecommunications network (e.g. covering multiple time zones) or multiple telecommunications networks (e.g. located in two or more operator domains between which the device may roam).

Examples of the device register system include a Home Location Register (HLR) of a 2G/3G network, a Home Subscriber Server (HSS) of an LTE network or an AAA database of a WLAN network. Examples of first and second network nodes include SGSNs of a telecommunications infrastructure comprising a 2G/3G network, MMEs of a telecommunications infrastructure comprising an LTE network or AAA proxies or Wireless Access Points of a telecommunications infrastructure comprising a WLAN network.

In an embodiment of the invention, the second network node is informed of the first access grant time interval, e.g. by transferring information regarding this time interval to the second network node. Accordingly, the second network node is informed about the preference and/or contractual obligations for the device when accessing the telecommunications infrastructure via the first network node and can adapt the first access grant time interval to the second access grant time interval as far as necessary.

As defined in the embodiments of claims 4 and 11, and different from existing roaming behaviour, the difference between the first and second access grant time interval may result in an approval of access by a device register system in a first part of the network for access to the telecommunications infrastructure, whereas the device is denied access to the telecommunications infrastructure at the second network node.

The reverse situation applies as well. A request to the device register system occurring outside the first access grant time interval and inside the second access grant time interval would normally be denied, but should now be allowed.

In order to inform the device register system of this deviant behaviour, the second network node may send an information message to the device register system informing it that the an acceptable access request of the device was nevertheless rejected. In WLAN networks, accounting messages may be used for this purpose, informing the device register system (or other accounting system in the home network) of a "null session". Also, the second network node preferably informs the device register system of the fact that it wants to locally apply the second access grant time interval such that the device register system refrains from applying the first access grant time interval.

It should be appreciated that the device may be informed about the applicable second access grant time interval, e.g. with the reject access message.

The device register system may also be informed about the applicable second access grant time interval as defined in claims 5 and 12. This provides information to the operator of a home network when traffic can be expected and enables the operator of the devices to obtain information on their devices from the device register system for e.g. troubleshooting or data arrival prediction purposes.

In an embodiment of the invention, a forbidden time interval may apply during which the home network of the device will not accept access by the device to the telecommunications infrastructure. The device register system may store the first access grant time interval and the forbidden time interval. The forbidden time interval is taken into account by the second network node when applying or selecting the second access grant time interval. The forbidden time interval, e.g. stored in the HLR or HSS of the home network, should be obeyed and cannot be adapted by further nodes or visited network operators. In an embodiment of the invention, the forbidden time interval is determined based on the expected and/or observed load in the home network, service windows and agreements with M2M application owners. The forbidden time interval can be adapted based on the information received from one or more of the second network nodes.

The second network node (e.g. the SGSN or MME of the visited network) may, in an embodiment of the invention, retrieve at least the access grant time interval and possibly also the forbidden time interval from the device register system storing the first access grant time interval and/or the forbidden time interval (e.g. from the HLR (in the home network)).

The second network node may then, in an embodiment of the invention, adapt the access grant time interval to a time interval that is more suitable. The adaptation of the time interval may be a shift of the time interval. The adaptation can be determined by the second network node itself, e.g. based on expected and/or observed load for this network node or on information from a time register. The time register may contain service windows, agreements with other M2M application customers and expected and/or observed network load.

Hereinafter, embodiments of the invention will be described in further detail. It should be appreciated, however, that these embodiments may not be construed as limiting the scope of protection for the present invention.

DETAILED DESCRIPTION OF THE DRAWINGS

Figure 1:
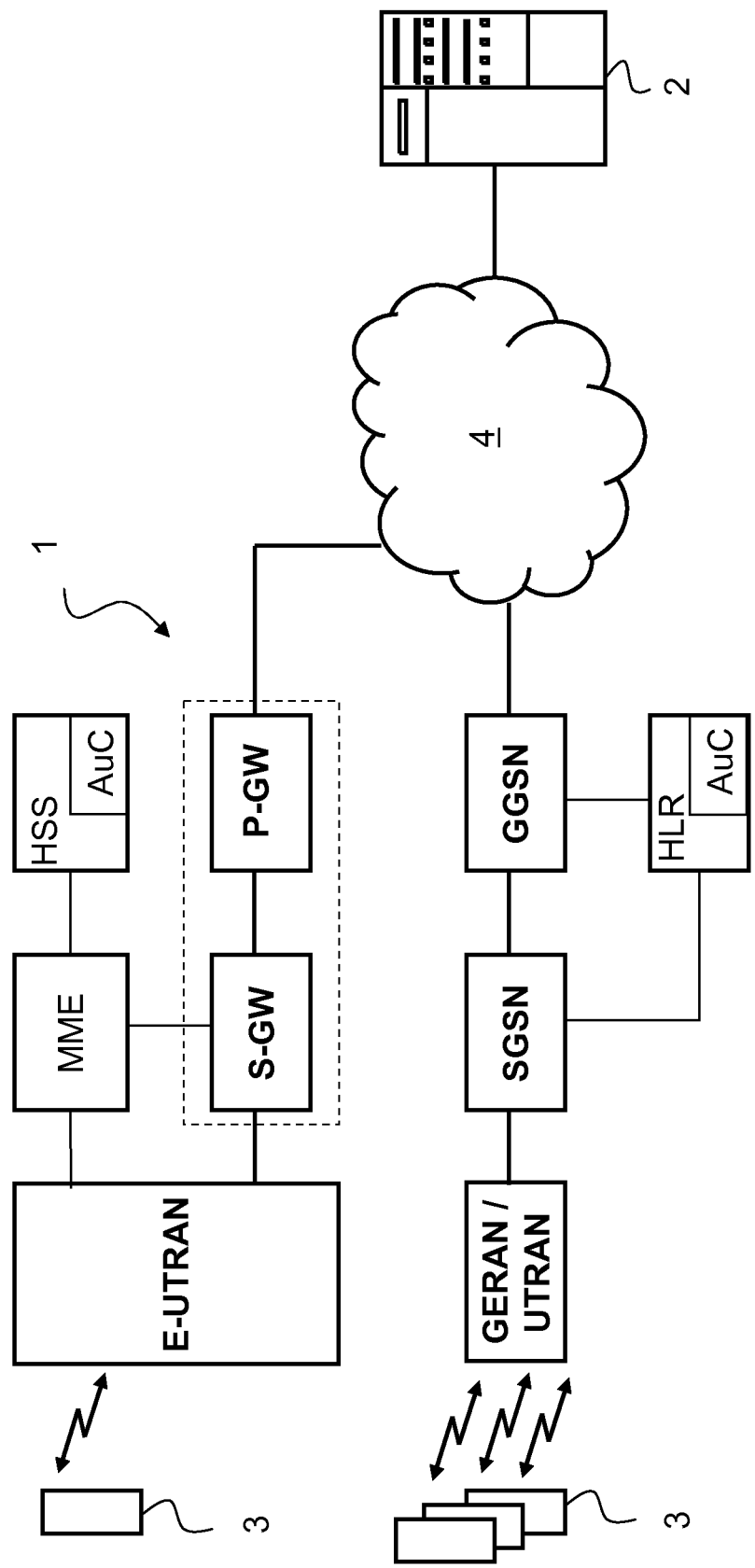
FIG. 1 is a schematic illustration of a telecommunications network connecting communication devices to an application server.

FIG. 1 shows a schematic illustration of a telecommunications network 1. The telecommunications network 1 enables data sessions between an application server 2 and a communication device 3 over a data network 4, wherein access of the communication device 3 to the telecommunications network 1 is wireless.

In the telecommunications network of FIG. 1, three generations of telecommunications networks are schematically depicted together for purposes of brevity. A more detailed description of the architecture and overview can be found in 3GPP TS 23.002 which is included in the present application by reference in its entirety.

The lower branch of FIG. 1 represents a GPRS or UMTS telecommunications network comprising a Gateway GPRS Support Node (GGSN), a Serving GPRS Support Node (SGSN) and a Radio Access Network (GERAN or UTRAN). For a GSM/EDGE radio access network (GERAN), the access network comprises a Base Station Controller (BSC) connected to a plurality of Base Station Transceivers (BTSs), both not shown. For a UMTS radio access network (UTRAN), the access network comprises a Radio Network Controller (RNC) connected to a plurality of NodeBs), also not shown. The GGSN and the SGSN are conventionally connected to a Home Location Register (HLR) that contains subscription information of the communication devices 3. In the figure, the HLR is combined with an authentication centre (AuC) for authenticating communication devices 3 in the network.

The upper branch in FIG. 1 represents a next generation telecommunications network, commonly indicated as Long Term Evolution (LTE) or Evolved Packet System (EPS). Such a network comprises a PDN Gateway (P-GW) and a Serving Gateway (S-GW). The E-UTRAN of the EPS comprises evolved NodeBs (eNodeBs or eNBs), not shown, providing wireless access for a communication device 3 that is connected to the S-GW via a packet network. The S-GW is connected to a Home Subscriber Server HSS and a Mobility Management Entity MME for signalling purposes. The HSS includes a subscription profile repository and an authentication centre (AuC).

Further information of the general architecture of an EPS network can be found in 3GPP TS 23.401.

The operator of application server 2 may have access to the HLR/HSS of the telecommunications network.

Figure 2:
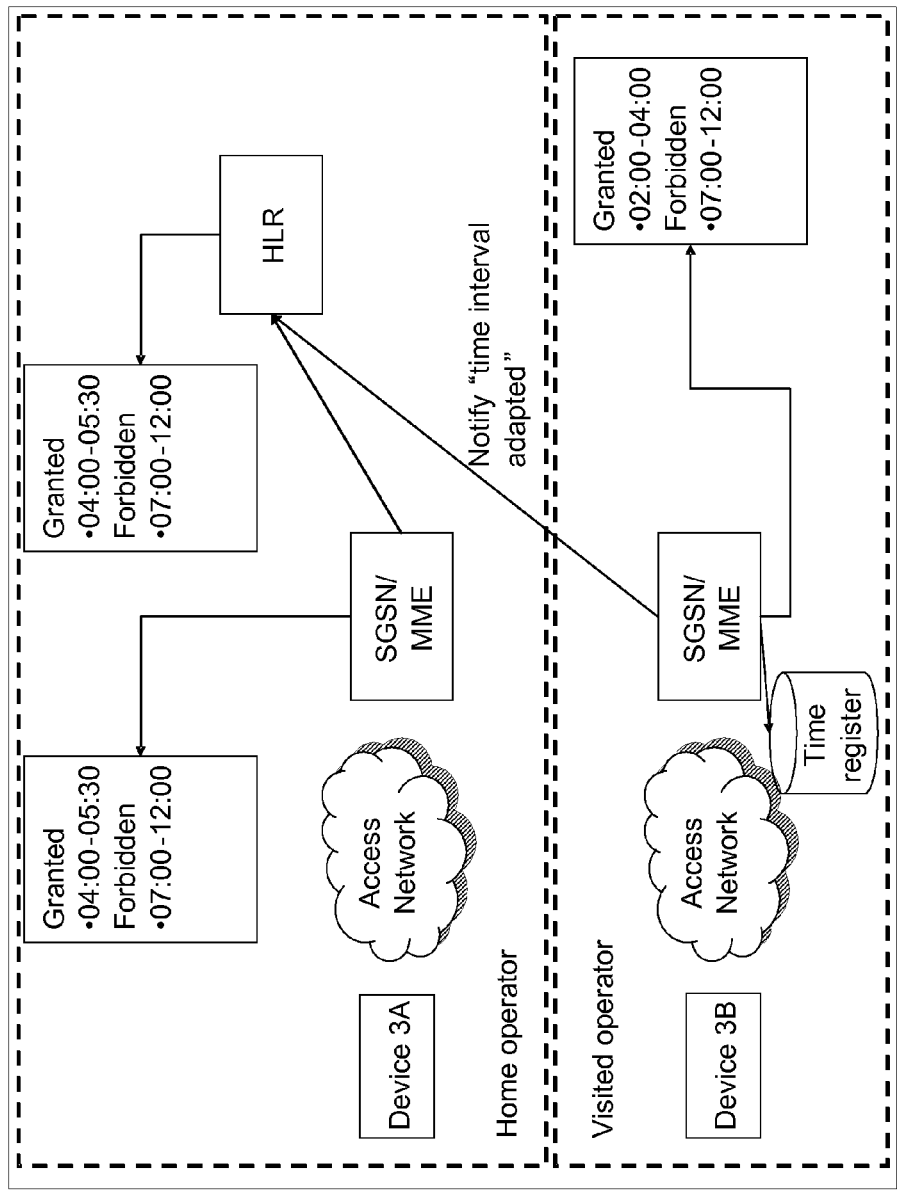
FIG. 2 is a schematic illustration of a telecommunications infrastructure according to a first embodiment of the invention.

FIG. 2 is a telecommunications infrastructure 10 having two operator domains according to an embodiment of the invention. FIG. 2 also shows two mobile communications devices 3A and 3B. Device 3A is within coverage of the home operator, device 3B is within coverage of a visited network of a visited operator. Both devices 3A, 3B are M2M devices and make use of a subscription that allows them to access the network of the home operator within a specific access grant time interval, in this case common to both devices. The time interval for this group of devices 3A, 3B is registered in the HLR (in the home network).

When device 3A accesses the infrastructure 10, the SGSN (in case of UMTS) or MME (in case of LTE) within the domain of the home operator, will request information about the device's subscription from the HLR. Part of this information is an access grant time interval (marked 'granted 04:00-05:30' in the figure) as well as a forbidden time interval (however, that last piece of information is not used). If the device 3A accesses the network within the access grant time interval (and all other conditions are met, such as properly passing authentication) the SGSN/MME will allow device 3A to access the network. When the current time is outside the access grant time interval the SGSN/MME will normally deny device 3A to access the network. Optionally the SGSN/MME may inform device 1 about the applicable access grant time interval, so device 3A will know the earliest possible time that it can attempt to successfully access the network. Optionally, device 3A may still access the network, albeit under amended conditions e.g. at a higher charge and/or at a lower quality of service.

When device 3B accesses the telecommunications infrastructure 10, its request for access is received by the SGSN/MME in the domain of the visited network operator. This SGSN/MME will also request information from the HLR (located with the home operator) and may indicate that it intends to apply a local time interval for controlling access. The information from the HLR may again include the access grant time interval and may also include the forbidden time interval from the HLR. The SGSN/MME checks whether this access grant time interval is a suitable time interval for the visited network. The visited network may have a "time register" that contains conditions and time intervals, which register the SGSN/MME can consult to decide on a proper access grant time interval (this time register may be located in the foreign HLR or elsewhere).

If the visited SGSN/MME decides to adapt the time interval (marked 'granted 02:00-04:00' in the figure) it will have to ensure that the adapted time interval is not within the forbidden time interval that is specified by the home operator. A further adjustment may be needed to resolve a conflict with the forbidden time interval. In the example of FIG. 2, the SGSN/MME decides to adapt it to 02:00-04:00, which does not conflict with 'forbidden 07:00-12:00' specified by the home operator. The SGSN/MME will then allow device 3B to access the infrastructure 10 if the time is within the adapted time interval (and provided that all other conditions are met). When the current time is outside the adapted time interval, the SGSN/MME will deny device 3B to access the infrastructure. Optionally the SGSN/MME may inform device 3B about the adapted time interval, so device 3B will know the earliest possible time that it can attempt to successfully access the network.

When the visited SGSN/MME has adapted the time interval, the M2M device 3B may optionally store this adapted time interval for later use.

When the visited SGSN/MME has decided to adapt the time interval, it may optionally inform the home operator, e.g. the HLR, about this adaptation.

The forbidden time interval stored in the home HLR is defined by the home operator. It can be based on parameters such as: expected and/or observed network load, agreements with other M2M applications, service windows, and agreements with the owner of the M2M server for the specific applications (e.g. the M2M server has a specific service window, or has other reasons for not being able to serve the M2M devices during the forbidden period).

It should be appreciated that the invention is not limited to a single time interval and that adapting a time interval may also comprise splitting a time interval into multiple time intervals or joining multiple time intervals.

The information with regard to time intervals can be formulated absolute, e.g. "between 16.00 and 17.00" or relative, e.g. "between one and two hours from now", "within 3 hours".

It should be appreciated that, preferably, all information regarding time intervals is exchanged in a uniform time code (e.g. UTC) to cope with regional time differences.

Figure 3:
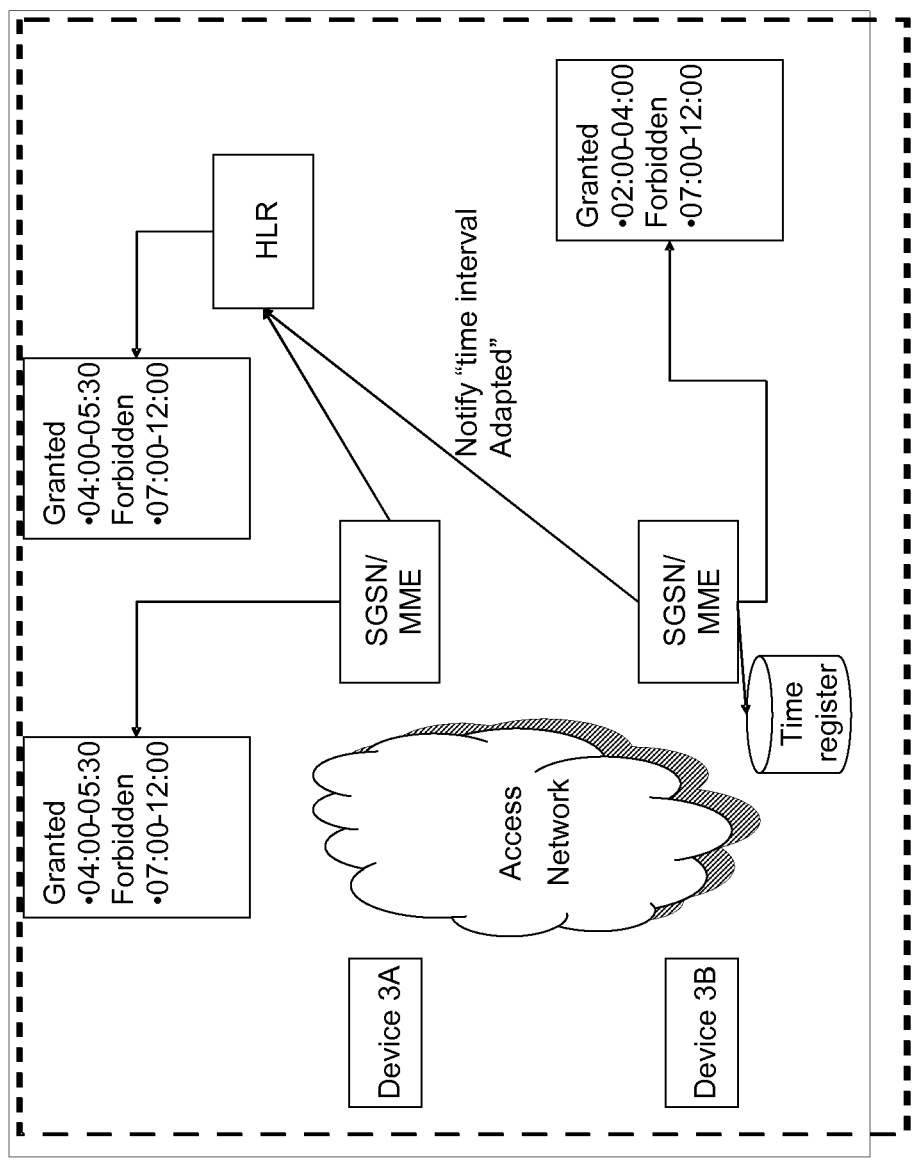
FIG. 3 is a schematic illustration of a telecommunications infrastructure according to a second embodiment of the invention.

FIG. 3 depicts another embodiment of the invention applicable in a single operator domain, wherein the SGSN can adapt the time interval on a local or regional basis. That would distribute the burden on the centralized GGSN/PDN-GW and HLR. This is especially advantageous when a dedicated HLR and GGSN/PDN-GW are used to handle M2M traffic or when a single operator network spans multiple time zones.

Figure 4A:
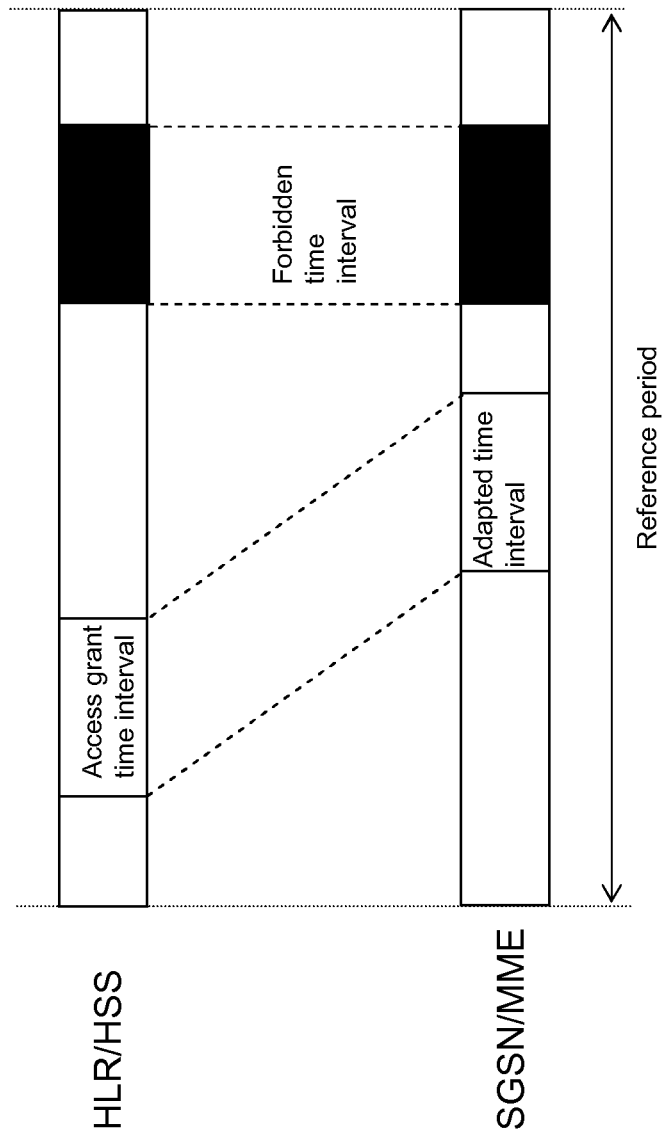
FIGS. 4A and 4B are schematic illustrations of various options of applicable time intervals.
Figure 4B:
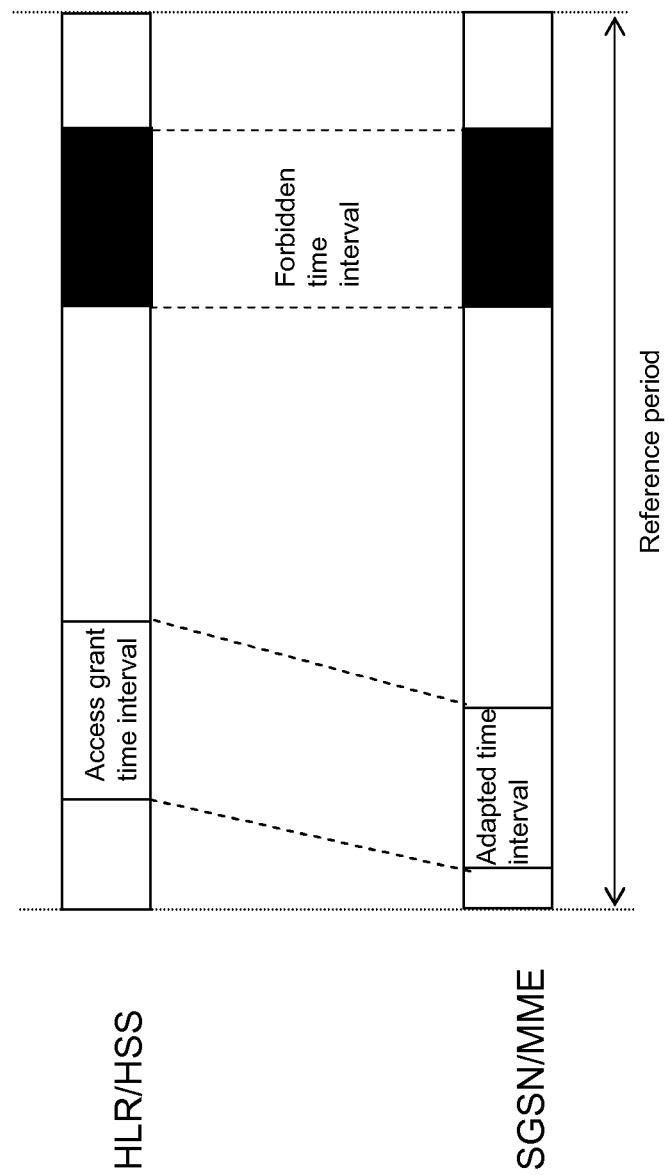

It should be appreciated that, typically, the (first) access grant time interval and the forbidden time interval as well as the adapted (second) access grant time interval and the forbidden time intervals are not complementary to each other, i.e. that these do not cover an entire reference period (e.g. a 24-hour period). This is indicated in FIGS. 4A and 4B. In FIG. 4B, the adapted time interval is smaller than the group time interval (marked 'access grant time') interval and partly overlaps that interval. The reference period may e.g. be one day, one week or one month.

Figure 5:
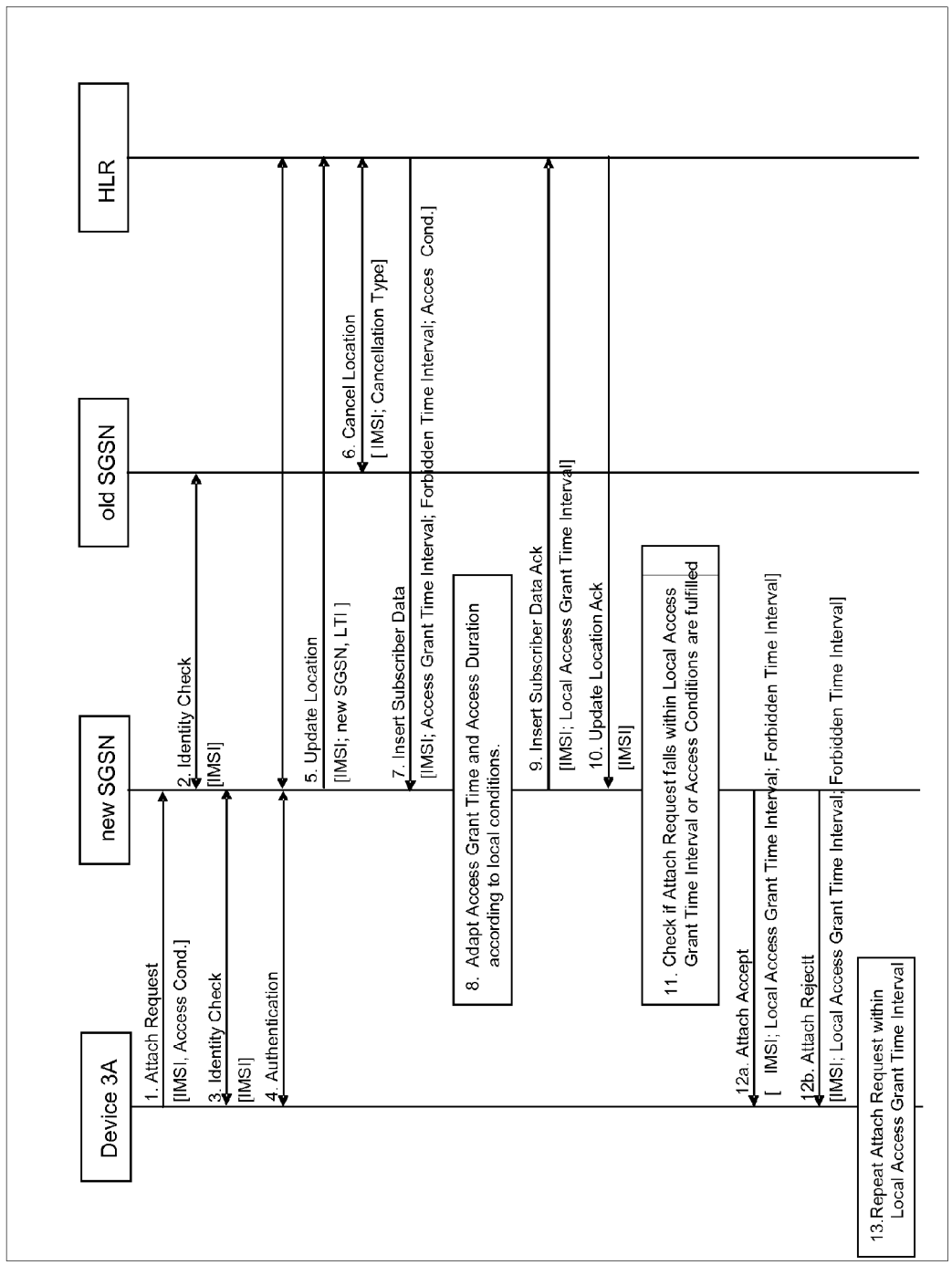
FIG. 5 provides a diagram showing an implementation example of applying a local access grant time interval in the telecommunications infrastructure of FIG. 2 or 3.

FIG. 5 provides a flow chart showing an implementation example of applying a local access grant time interval in the telecommunications infrastructure 10 of FIG. 2 or 3. The flow chart depicts a packet switched (PS) attach request by device 3A formerly connected to an old SGSN and now connected to a new SGSN (e.g. resulting from a hand-over involving switching SGSN areas) for which a locally defined access grant time interval applies. In FIG. 5, the old SGSN functions as a first network node and the new SGSN functions as a second network node. The HLR is the device register system.

In step 1, device 3A initiates a PS Attach procedure by generating an Attach Request message to the new SGSN. The message contains the IMSI of device 3A and possibly indicates an Access Condition. It should be noted that for security reasons 3GPP has specified that after the initial exchange of the IMSI the device's subscription may further be identified by the (Packet-Temporary Mobile Subscriber Identity) P-TMSI, which is a temporary identifier associated with the IMSI for a short time. In this embodiment only IMSI is mentioned but P-TMSI would be applicable as well. The parameter(s) reflecting the Access Condition may contain information about the ability of the device 3A to access the infrastructure 10 outside the applicable access grant time interval, e.g. the price or acceptable quality of service.

In step 2, since the actual serving network node has changed from an old SGSN to a new SGSN and if the device 3A has identified itself by IMSI, the new SGSN performs an Identity Check to the old SGSN. If the device 3A is unknown in both the old and the new SGSN, the new SGSN performs an Identity Check with the device 3A wherein device 3A responds with the IMSI (step 3). Step 4 involves authentication. IMEI checking may also be performed (not shown).

Since the SGSN is new (this may also result from a very first attach request by the device 3A), the new SGSN informs the HLR by sending an Update Location message in step 5. The Update Location message contains the IMSI of the device 3A and the address of the new SGSN. The Update Location message also contains an indicating field LTI indicating that the new SGSN applies a local access grant time interval. The LTI indication may be used by the HLR to ignore the access grant time interval defined in the HLR and applicable when requesting access via the old SGSN. In step 6, the HLR sends a Cancel Location message to the old SGSN, which message is acknowledged by the old SGSN.

In step 7, the HLR sends an Insert Subscriber Data message to the new SGSN. The parameters contained in this message may include the IMSI of device 3A, the access grant time interval as stored in the HLR, the forbidden time interval and, possibly, the access conditions. Upon receipt of the Insert Subscriber Data message, the new SGSN validates whether the device 3A is still within reach of the SGSN and may adapt the access grant time interval according to local requirements or needs. The forbidden time interval may not be adjusted and the adaptation of the access grant time interval should be such that an overlap with the specified forbidden time interval is avoided.

In step 9, if all checks are successful, the new SGSN returns an Insert Subscriber Data Acknowledgement message to the HLR. The message includes the locally adapted access grant time interval that is temporarily stored in the HLR.

In step 10, the HLR acknowledges the Update Location message of step 5 by sending an Update Location Acknowledgement message to the new SGSN.

In step 11, the new SGSN now checks if the Attach Request from the device 3A falls within the adapted access grant time interval as explained previously with reference to FIG. 2. When outside the adapted access grant time interval and the forbidden time interval, access may still be granted when the Access Conditions received from device 3A in step 1 match the Access Conditions received from the HLR/HSS in step 7.

If the Attach Request of step 1 falls within the adapted access grant time interval or if the Access Conditions are fulfilled an Attach Accept is sent to the device 3A as illustrated by step 12a. This Attach Accept message contains the IMSI, the applicable access time interval and, possibly, the forbidden time interval. The device 3A is now aware when it is allowed to send Attach Requests, at least until handover to a further new SGSN.

If the Attach Request does not fall within the Local Access Grant Time interval or the Access Conditions are not fulfilled, an Attach Reject is sent to the device 3A as illustrate by step 12b. This Attach Reject message contains the IMSI, the applicable access time interval and, possibly, the forbidden time interval. The device 3A is now aware when it is allowed to send Attach Requests, at least until handover to a further new SGSN.

When not attached, device 3A may repeat an Attach Request to the new SGSN at a later time within the communicated access grant time interval or when it meets the Access Conditions when outside the local access grant time interval and forbidden time interval.

Figure 6:
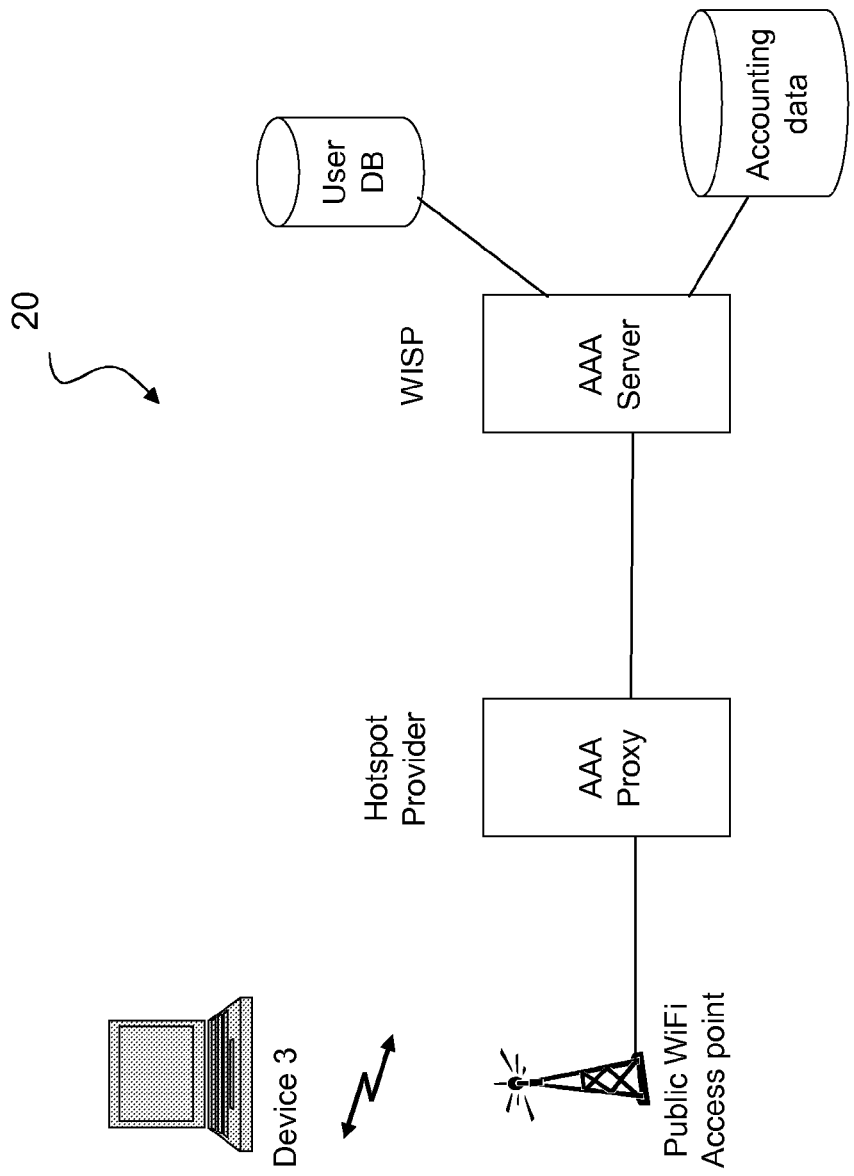
FIG. 6 is a schematic illustration of a telecommunications infrastructure according to a third embodiment of the invention.

FIG. 6 provides a schematic illustration of a telecommunications infrastructure 20 according to a third embodiment of the invention. The telecommunications infrastructure 20 involves a WLAN network comprising a user database DB in a combination with an AAA server of a wireless internet provider WISP as a device register system and a AAAn proxy as a second network node. For access to public WiFi hotspots a roaming mechanism is implemented based on RADIUS roaming using the RADIUS AAA protocol. RADIUS AAA is defined in RFC 2138 and RFC 2139. The end-user has a subscription with the WISP. The WISP hands out credentials (e.g. username/password) to the end-user. Whenever a user is within reach of a public WiFi hotspot, the user can login with his device 3 and use the hotspot if the hotspot owner and WISP belong to the same "alliance" (i.e. having roaming agreements in place, either direct or via an intermediate party). To provide the end-user access to a hotspot, several specifications exist that are all based on the same RADIUS mechanism as shown in FIG. 6. In ETSI TS 183.019 the relevant network elements are AAA Proxy, AAA Server and Access Controller and Access Point. In FIG. 6, the Access Controller and Access Point are combined into the Public WiFi Access Point. In 3GPP TS 23.234, the AAA Proxy is referred to as 3GPP AAA Proxy, the AAA Server is called 3GPP AAA Server. The Access Controller is called Wireless Access Gateway, which in FIG. 6 is combined into the Public WiFi Access Point.

It should be noted that more AAA proxies may be present in the infrastructure 20.

In the infrastructure 20 of FIG. 6, the WISP can control whenever a device 3 is allowed access to the infrastructure 20 by defining a (first) access grant time interval in the user database. AAA server receives incoming access requests, checks the user credentials and, possibly, applies the first access grant time interval, to decide whether or not a particular device 3 may access the infrastructure.

Figure 7:
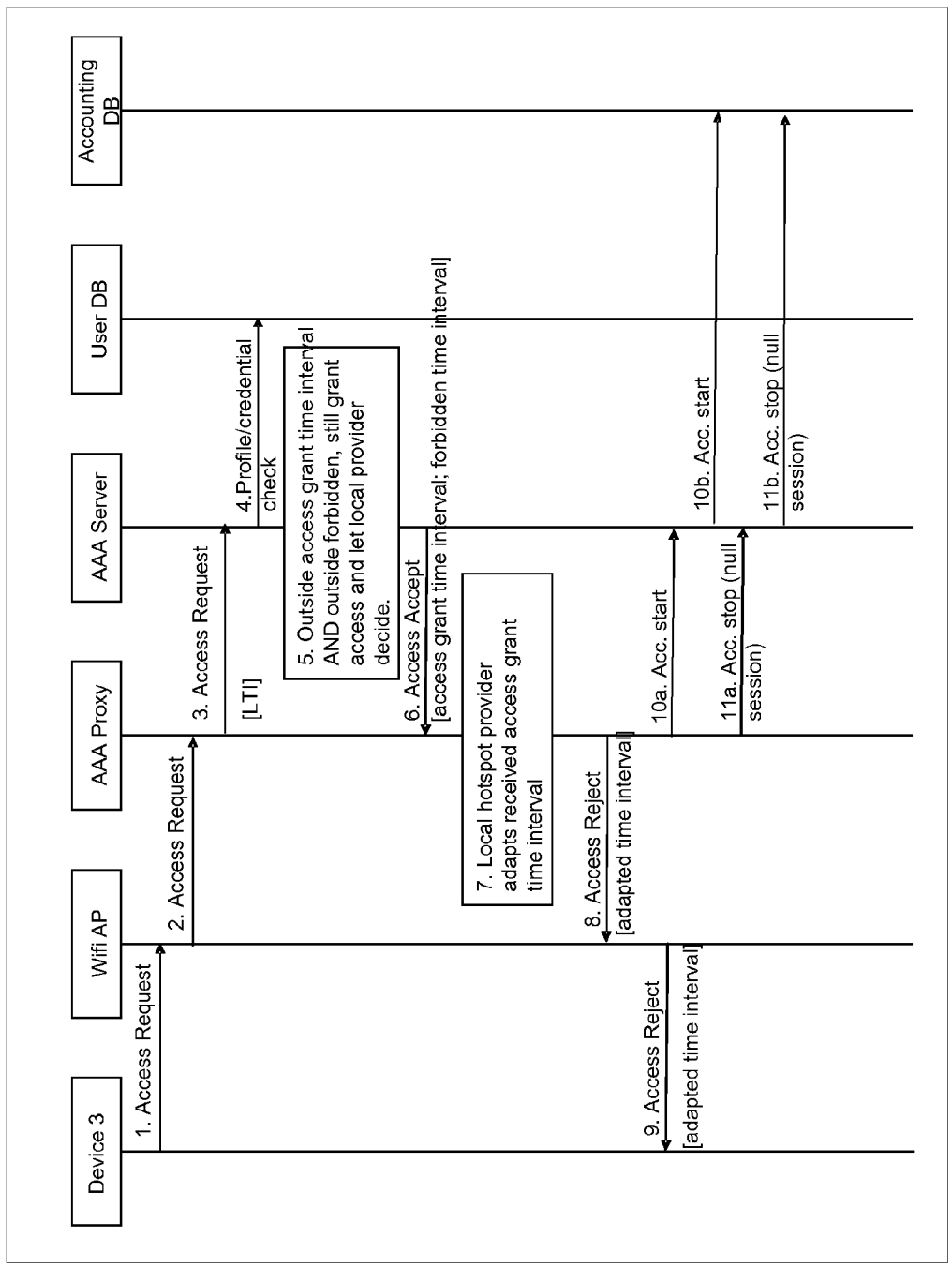
FIG. 7 provides a diagram showing an implementation example of applying a local access grant time interval in the telecommunications infrastructure of FIG. 6.

FIG. 7 provides a diagram showing an implementation example of applying a local access grant time interval in the telecommunications infrastructure of FIG. 6. In this case, a device 3 connects to a WiFi hotspot outside its access grant time interval as defined by the global WISP. The local hotspot provider decides to adapt the access grant time interval.

In step 1, the device 3 requests access to the public WiFi Access Point (AP) providing user credentials. The WiFi AP forwards a RADIUS Access Request to the AAA Proxy in step 2 that forwards the RADIUS AAA Request to the AAA Server in step 3. In forwarding the request of step 3, the AAA Proxy includes a RADIUS parameter, e.g. an indicating field LTI indicating that the AAA Proxy applies a local access grant time interval, in the forwarded message. The LTI indication may be used by the AAA Server to ignore the access grant time interval defined in the user database. The LTI indication may also be provided by the WiFi AP.

In step 4, the AAA Sever verifies the user credentials and profile. In this step, it will appear if a time-based subscription applies for device 3A In step 5, if the AAA Server has positively verified the credentials, it is observed that the access request is received outside the first access grant time interval and outside a forbidden time interval. The LTI indicator may be used to disregard application of the first access grant time interval stored in the user database.

In step 6, the AAA Server sends an Access Accept message as the credentials are positively verified and the first access grant time interval is disregarded. The Access Accept message includes the first access grant time interval and the forbidden time interval.

In step 7, the AAA Proxy adapts the access grant time interval received from the AAA Server. As the Access Request from step 1 is outside this adapted time interval, the AAA Proxy changes the Access Accept message from step 6 in an Access Reject message in steps 8 and 9, even though the credentials have been positively verified and, possibly, the Access Request in step 1 was received within the first access grant time interval. Steps 7 and 8 may alternatively be performed by the WiFi AP.

The Access Reject message of step 8 contains the adapted access grant time interval and, optionally, the forbidden time interval, to inform device 3 when it may access. As RADIUS AAA is a stateless protocol, the AAA server and user database is preferably informed of the Access Reject message. This is advantageously performed by making use of the existing Accounting messages as indicated in FIG. 7.

In steps 10a and 10b, the AAA Proxy sends an Accounting Start message to AAA Server (step 10a) which is stored in Accounting DB (step 10b). In order to indicate that the Access Request has been rejected, these steps are immediately succeeded by the AAA Proxy sending Accounting Stop message indicating this is a null session to AAA Server (step 11a) which is stored in Accounting DB (step 11b). In this manner, the accounting database always reflects Accounting Start and Stop messages for all session wherein the AAA Server has sent an Access Accept message as in step 6. It should be appreciated that the order of steps 10b and 11a may be reversed depending on how fast the AAA Server processes accounting messages.

It should be appreciated that various modifications have been envisaged for the above-described methods.

Hitherto, it was assumed that only two classes of end-user subscriptions exist, either with the possibility of time-based access control or without. However, in practice, several classes of time-based subscriptions exist. As an example, the most expensive subscription always gets access and there is a range of other subscriptions that each match to several classes of timeslots or situations of traffic load.

Furthermore, as previously mentioned, there may be a possibility that for a certain time-based subscriptions, access is still granted outside the adapted access grant time interval but at a higher price. To implement this in the process of FIG. 7, the AAA Sever may identify that for a particular device 3 a time-based subscription for which higher prices can be charged in certain time periods is enabled. Then, either the AAA Proxy or the Access Point will determine that at the current local time and the given subscription type the end-user is only allowed access at a higher price. It will allow the device 3 to access the infrastructure and will optionally inform the device 3 of the higher price. The user (or an automated procedure at the device 3) can optionally disconnect immediately if it does not want to accept the higher price. If the user does not disconnect, the Access Point starts sending Accounting Start/Intermediate/Stop messages as it would in the regular case and these are forwarded to the AAA Server that stores it in the WISP accounting database. However, either the Access Point or AAA Proxy will add pricing information to these accounting messages so the WISP will know that the end-user accessed the network at a higher price and can bill the end-user accordingly. Pricing information can either be a fixed tariff but can also be an indication of a tariff class.

Furthermore, the time-based subscription of device 3 may be of such a type that the device 3 is allowed to use the network outside the applicable access grant time interval (except for the forbidden time interval but that during specific time periods it will be provided with a lower quality of service. For instance the bandwidth generated by the device 3 may be limited or its traffic will be labelled with a low priority. Implementing this scenario may be completely up to the discretion of either the Access Point or the AAA Proxy. It could optionally inform the device 3 that a lower quality of service is available and the user (or automated procedure at the device 3) may decide to disconnect from the network.

Combinations of the above modifications have been envisaged. For instance the device 3 may be given a choice in steps 8/9 (e.g. either accept the higher price, the lower quality of service or disconnect and wait for a regular time slot).

Figure 8:
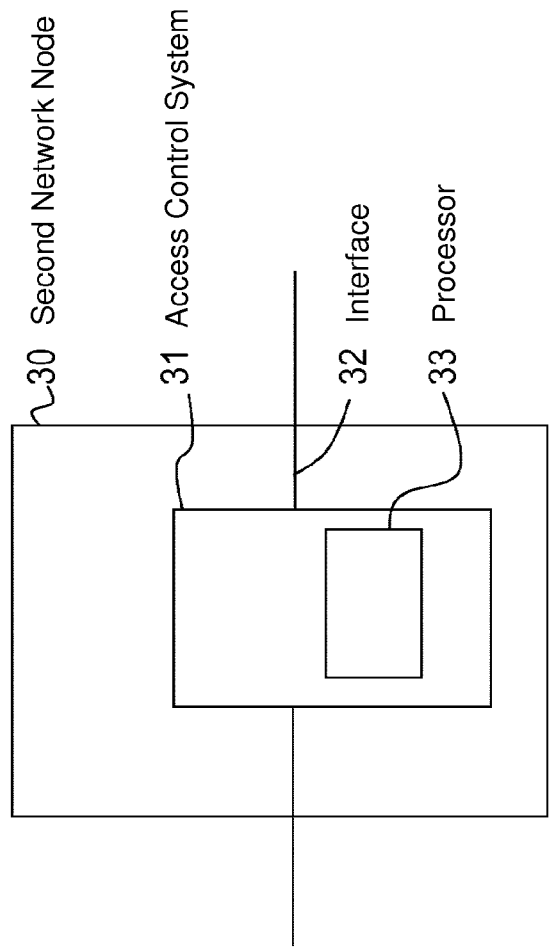
FIG. 8 is a schematic illustration of a second network node containing an access control system.

Finally, FIG. 8 is a schematic illustration of a second network node 30, such as an SGSN/MME or an AAA proxy. The second network node 30 comprises an access control system 31. The access control system has an input or interface 32 for receiving information (such as the information indicated in FIGS. 5 and 7 received by the new SGSN and the AAA Proxy respectively). The access control system 31 also contains a processor 33 for applying the second access grant time interval, possibly by adapting the first access grant time interval.

Furthermore, the time interval could also be used in such a way that access is granted but at other conditions (e.g. lower QoS, higher price).

One embodiment of the invention may be implemented as a program product for use with a computer system. The program(s) of the program product define functions of the embodiments (including the methods described herein) and can be contained on a variety of non-transitory computer-readable storage media. Illustrative non-transitory computer-readable storage media include, but are not limited to: (i) non-writable storage media (e.g., read-only memory devices within a computer such as CD-ROM disks readable by a CD-ROM drive, ROM chips or any type of solid-state non-volatile semiconductor memory) on which information is permanently stored; and (ii) writable storage media (e.g., floppy disks within a diskette drive or hard-disk drive or any type of solid-state random-access semiconductor memory, flash memory) on which alterable information is stored.

The invention claimed is:

1. A method for controlling wireless access to a telecommunications infrastructure for a device, the method comprising:
    storing a first access grant time interval applicable for granting access for the device to the telecommunications infrastructure in a device register system;
    applying the first access grant time interval when the device requests access to the telecommunications infrastructure via a first network node of the telecommunications infrastructure;
    providing the first access grant time interval from the device register system to a second network node of the telecommunications infrastructure when the device requests access to the telecommunications infrastructure via the second network node;
    determining a second access grant time interval in the second network node based on the first access grant time interval provided by the device register system; and
    applying the second access grant time interval in the second network node of the telecommunications infrastructure when the device requests access to the telecommunications infrastructure via the second network node, wherein the second access grant time interval is applicable for granting access for the device to the telecommunications infrastructure and is different from the first access grant time interval.

2. The method according to claim 1, wherein the first network node and the device register system are located in a home network of the device and the second network node is located in a visiting network of the device.

3. The method according to claim 1, further comprising:
    receiving an access request from the device at the second network node during the first access grant time interval and outside the second access grant time interval forwarding the access request from the second network node to the device register system;
    receiving an access grant message from the device register system at the second network node; and
    rejecting the access request from the device by applying the second access grant time interval at the second network node.

4. The method according to claim 1, further comprising:
    transmitting to the device register system an information message regarding the second access grant time interval applied by the second network node.

5. The method according to claim 1, further comprising:
    storing a forbidden time interval in the device register system; and
    selecting the applicable second access grant time interval for the second network node so as to avoid an overlap with the forbidden time interval in the device register system.

6. The method according to claim 5, further comprising:
    transferring the forbidden time interval to the second network node.

7. A telecommunications infrastructure comprising:
    a device register system configured to store, in non-transitory computer readable media, a first access grant time interval applicable for granting access for the device to the telecommunications infrastructure;
    a first network node configured to grant access during the first access grant time interval when the device requests access via the first network node; and
    a second network node including an access controlling system configured to apply a second access grant time interval to control access to the telecommunications infrastructure when the device requests access via the second network node, the second access grant time interval being applicable for granting access for the device to the telecommunications infrastructure and being different from the first access grant time interval, the access controlling system including:
        an interface configured for receiving the first access grant time interval from the device register system, and
        a processor configured to determine the second access grant time interval based on the received first grant access time interval.

8. The telecommunications infrastructure according to claim 7, wherein the device register system and first network node are located in a home network of the device and the second network node is located in a visiting network of the device.

9. The telecommunications infrastructure according to claim 7, wherein the access controlling system is configured for:
  receiving an access request from the device during the first access grant time interval and outside the second access grant time interval;
  forwarding the access request to the device register system;
  receiving an access grant message from the device register system;
  rejecting the access request from the device by applying the second access grant time interval at the second network node; and
  transmitting a reject information message to the device register system.

10. The telecommunications infrastructure according to claim 7, wherein the access controlling system is further configured for transmitting to the device register system an information message regarding the second access grant time interval applied by the second network node.

11. The telecommunications infrastructure according to claim 7, wherein the access controlling system is further configured for (i) selecting the second access grant time interval so as to avoid an overlap with a forbidden time interval defined in the device register system, and (ii) receiving the forbidden time interval from the device register system.

12. A visiting network for the device comprising the second network node of the telecommunications infrastructure according to claim 7.

13. An access controlling system provided in at least one of the first network node or the second network node of the telecommunication infrastructure according to claim 7.

14. The method according to claim 3, further comprising transmitting a reject information message from the second network node to the device register system.

15. The method according to claim 1, wherein the determining the second access grant time interval includes at least one of shifting the first access grant time interval, modifying a start time of the first access grant time interval, or modifying an end time of the first access grant time interval.

16. The method according to claim 1, wherein the determining the second access grant time interval includes splitting the first access grant time interval into multiple time intervals.

17. The telecommunications infrastructure according to claim 7, wherein the processor is configured to determine the second access grant time interval by at least one of shifting the first access grant time interval, modifying a start time of the first access grant time interval, or modifying an end time of the first access grant time interval.

18. The telecommunications infrastructure according to claim 7, wherein the processor is configured to split the first access grant time interval into multiple time intervals to determine the second access grant time interval.

* * * * *